(12) United States Patent
Maitland

(10) Patent No.: US 6,418,252 B1
(45) Date of Patent: Jul. 9, 2002

(54) LIGHT DIFFUSING FIBER OPTIC CHAMBER

(75) Inventor: Duncan J. Maitland, Lafayette, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/761,024

(22) Filed: Jan. 16, 2001

(51) Int. Cl.⁷ .................................................. G02B 6/26
(52) U.S. Cl. ........................................................ 385/31
(58) Field of Search ............................. 385/31, 32, 33, 385/34, 38, 39

(56) References Cited

U.S. PATENT DOCUMENTS

| | | | |
|---|---|---|---|
| 5,106,181 A | * 4/1992 | Rockwell, III | ................. 385/1 |
| 5,207,669 A | 5/1993 | Baker et al. | ................... 606/7 |
| 5,337,381 A | * 8/1994 | Biswas et al. | .............. 385/128 |
| 5,479,543 A | * 12/1995 | Black | ......................... 385/139 |
| 5,631,994 A | * 5/1997 | Appeldorn et al. | ......... 362/551 |
| 5,754,717 A | 5/1998 | Esch | ........................... 385/31 |
| 5,857,761 A | * 1/1999 | Abe et al. | .................... 362/268 |
| 5,987,199 A | * 11/1999 | Zarian et al. | ............... 362/559 |
| 6,102,917 A | 8/2000 | Maitland et al. | ............ 606/108 |
| 6,301,418 B1 | * 10/2001 | Freier et al. | ................ 362/558 |

* cited by examiner

Primary Examiner—Tulsidas Patel
(74) Attorney, Agent, or Firm—Eddie E. Scott; Alan H. Thompson

(57) ABSTRACT

A light diffusion system for transmitting light to a target area. The light is transmitted in a direction from a proximal end to a distal end by an optical fiber. A diffusing chamber is operatively connected to the optical fiber for transmitting the light from the proximal end to the distal end and transmitting said light to said target area. A plug is operatively connected to the diffusing chamber for increasing the light that is transmitted to the target area.

24 Claims, 6 Drawing Sheets

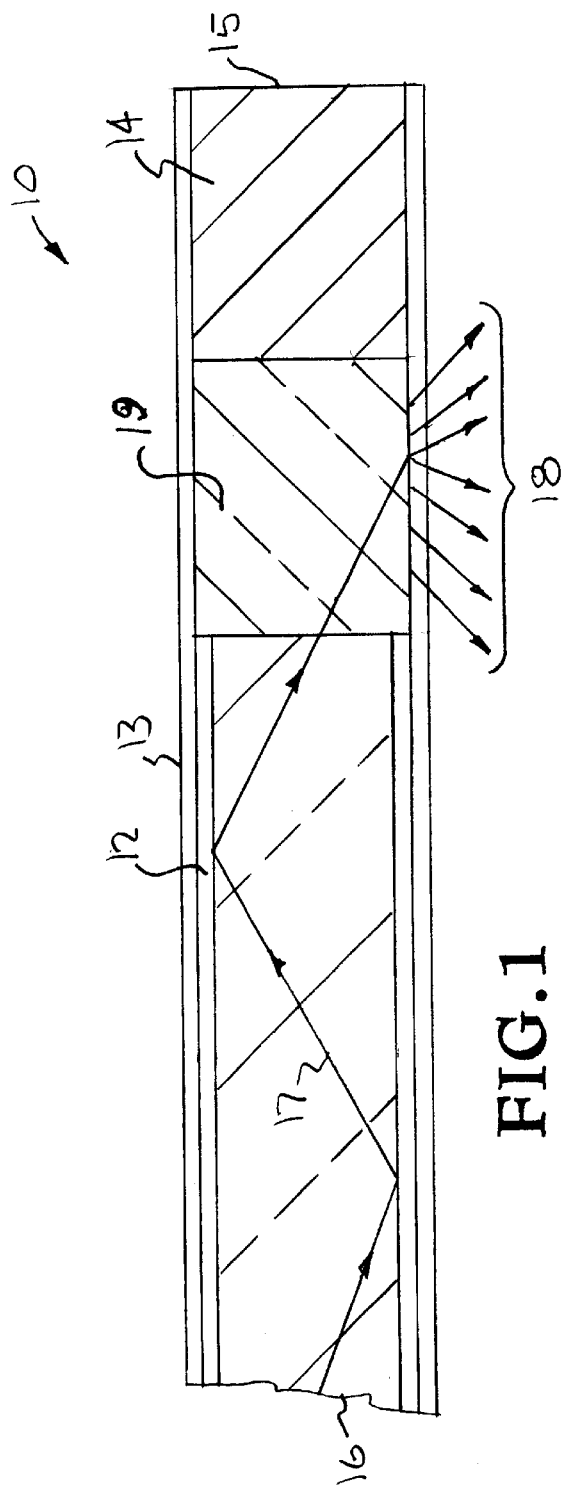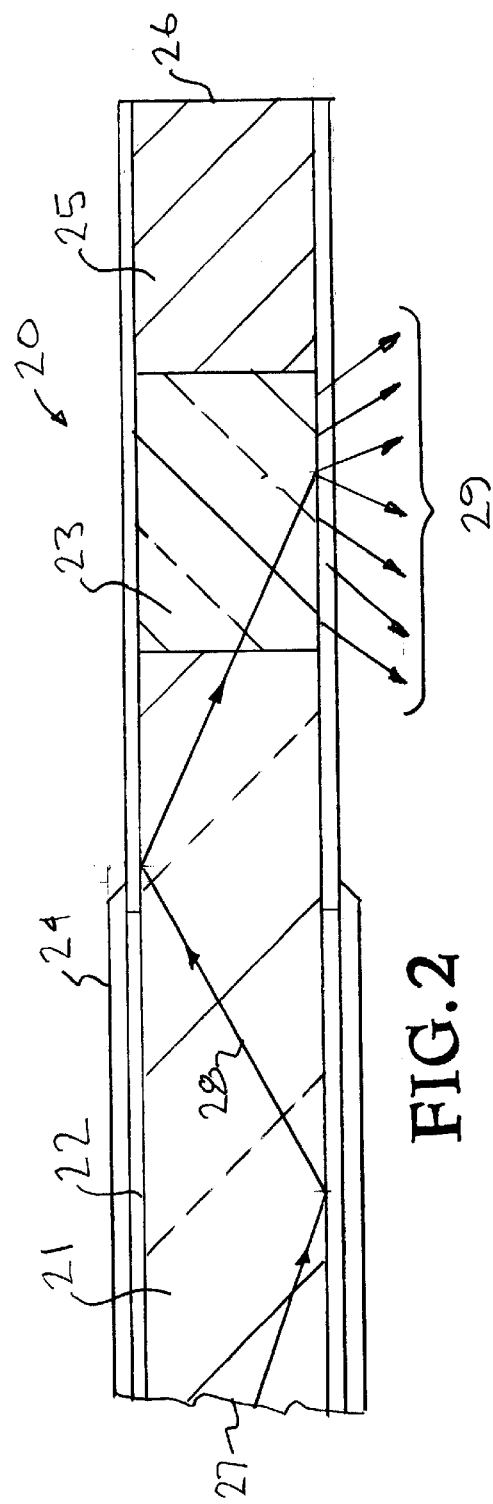

LIGHT DIFFUSING FIBER OPTIC CHAMBER

CROSS REFERENCE TO RELATED APPLICATIONS

Some subject matter is disclosed and claimed in the following commonly owned, copending, U.S. Patent Application, "SHAPE MEMORY POLYMER ACTUATOR AND CATHETER," by Duncan J. Maitland, Abraham P. Lee, Daniel L. Schumann, Dennis L. Matthews, Derek Decker, and Charles A. Jungreis, patent application Ser. No. 09/761,023 filed Jan. 17, 2001, which is hereby incorporated by reference in its entirety.

The United States Government has rights in this invention pursuant to Contract No. W-7405-ENG48 between the United States Department of Energy and the University of California for the operation of Lawrence Livermore National Laboratory.

BACKGROUND OF THE INVENTION

1. Field of the Invention

The present invention relates to light diffusing systems.

2. State of Technology

U.S. Pat. No. 5,754,717 for a light-diffusing device for an optical fiber, methods of producing and using same, and apparatus for diffusing light from an optical fiber, by Victor C. Esch, patented May 19, 1998, provides the following description: "A diffusing tip is provided for diffusing light from a light-emitting end of an optical fiber in a radial distribution pattern relative to the axis of the tip and along a length of the tip. The tip has an inner core and an outer covering which define a light guide. The outer covering is modified on its interior surface adjacent to the core such that light transmitted down the light guide is removed from the core upon encountering a surface modification on the interior surface. The light so removed is transmitted to the outer surface along the length of the tip, where it can be used to irradiate a selected object or material. The diffusing tip preferably provides light in a substantially uniform intensity distribution for the substantially uniform irradiation of a selected object or material."

U.S. Pat. No. 6,102,917 for a shape memory polymer (SMP) gripper with a release sensing system, by Maitland et al, patented Aug. 15, 2000, provides the following description: "A system for releasing a target material, such as an embolic coil from an SMP located at the end of a catheter utilizing an optical arrangement for releasing the material. The system includes a laser, laser driver, display panel, photodetector, fiber optics coupler, fiber optics and connectors, a catheter, and an SMP-based gripper, and includes a release sensing and feedback arrangement. The SMP-based gripper is heated via laser light through an optic fiber causing the gripper to release a target material (e.g., embolic coil for therapeutic treatment of aneurysms). Various embodiments are provided for coupling the laser light into the SMP, which includes specific positioning of the coils, removal of the fiber cladding adjacent the coil, a metal coating on the SMP, doping the SMP with a gradient absorbing dye, tapering the fiber optic end, coating the SMP with low refractive index material, and locating an insert between the fiber optic and the coil."

U.S. Pat. No. 5,207,669 for an optical fiber diffusion tip for uniform illumination, by Baker et al, patented May 4, 1993, provides the following description: "A diffusion tip coupled to the end of an optical fiber for directing laser energy outwardly in a cylindrical or other desired radiation pattern. The diffusion tip includes a core, a cladding around the core and a jacket around the cladding. The cladding has an index of refraction that is lower than that of the core and has a thickness selected to transmit a portion of the laser radiation that is carried through the optical fiber so that laser radiation penetrates through the cladding and the jacket over the length of the diffusion tip. The thickness of the cladding is about the same as or slightly less than the penetration depth of the evanescent field in the cladding. The cladding can be tapered along the length of the diffusion tip to provide a uniform radiation pattern. The diffusion tip is particularly useful in a laser balloon catheter utilized in coronary angioplasty."

U.S. Pat. No. 5,337,381 for a fiber optic cylindrical diffuser, by Biswas et al, patented Aug. 9, 1994, provides the following description: "A fiber optic, cylindrical, light diffuser for medical use includes an unclad distal fiber end where the exposed core end has a conical shape. The core end is enclosed by a sleeve which contacts the clad portion of the fiber only and defines a closed chamber with the distal end of the fiber. The chamber is filled with light diffusing material. The diffuser exhibits highly uniform output light distribution and is capable of carrying relatively high power densities safely."

SUMMARY OF THE INVENTION

The present invention provides a light diffusion system for transmitting light to a target area. The light is transmitting in a direction from a proximal end to a distal end by an optical fiber. A diffusing chamber is operatively connected to the optical fiber for transmitting the light from the proximal end to the distal end and transmitting said light to said target area. A plug is operatively connected to the diffusing chamber for increasing the light that is transmitted to the target area. Additional aspects, advantages, and features of the invention are set forth in part in the following description. Various aspects, advantages, and features of the invention will become apparent to those skilled in the art upon examination of the description and by practice of the invention.

BRIEF DESCRIPTION OF THE DRAWINGS

The accompanying drawings, which are incorporated into and form a part of the disclosure, illustrate embodiments of the invention, and, together with the description, serve to explain the principles of the invention.

FIG. 1 illustrates a basic light diffusion system constructed in accordance with the present invention.

FIG. 2 illustrates another version of a basic light diffusion system constructed in accordance with the present invention.

DETAILED DESCRIPTION OF THE INVENTION

Figure 3:
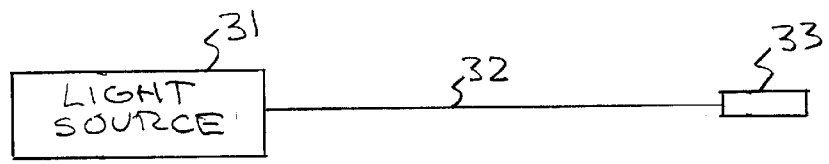
FIG. 3 illustrates basic modes and systems of operating a light diffusion system constructed in accordance with the present invention.

Referring to the drawings, and in particular to FIG. 1, an embodiment of a light diffusion system constructed in accordance with the present invention is illustrated. Fiber optics provide the opportunity to guide light to a desired target and distribute the light at or in the target. When the target, as a whole or in part, circumferencially surrounds the fiber, methods of extracting the light from the fiber and distributing the light at or on the target are required. These systems are often classified as light diffusing devices. The present invention also provides general sensing locations and methods that enhance the performance of a diffusing chamber.

The present invention provides a light diffusing device and method, sensing systems that are complementary to the diffusing device, and optical systems that employ the diffusing device and/or sensors. In addition to the primary objective of bringing light to a target, optical systems provide opportunity to either detect, via a transducer, the status of environmental parameter or parameters and/or detect how the exposure of light to the target changes the target or environment.

The light diffusion system of the present invention can be used with light activated actuator and catheter systems for removing blockages from luminal structures. The systems are similar to a guide wire that is commonly pushed through a blockage such as a blood clot, fed through the clot, and then actuated to open like an umbrella. The catheter uses an expanding opto-mechanical actuator system. The expanded opto-mechanical device is retracted and the blockage is removed. The blockage could be a blood clot, plaque, other emboli, or other blockage. The system uses energy in the form of light guided by an optical fiber to a light diffusing device that radiates the light into the shape memory polymer (SMP). Actuation is achieved by converting optical energy into thermal energy that allows the stored energy in the SMP to be released. The optical energy is absorbed by the SMP and converted into thermal energy that heats the SMP above-its transition temperature and the SMP moves to its primary shape, resulting in opto-mechanical actuation. The SMP actuator is drawn backward resulting in the removal of the blockage from the vessel.

Light diffusion systems have other medical uses. "Photodynamic Therapy" (PDT) is a term for a common method for the treatment of cancer and in humans and in animals. In one class of diagnosis and treatment with photosensitizing drugs, tumors are detected and treated by irradiating the tumors with light after the drug accumulates in the tumor. The drugs are photosensitizing and some of the drugs in this class are derivatives of hemoglobin. The photosensitive characteristic of tumor-selective porphyrin compounds also make them useful in the treatment of tumors.

Referring again to FIG. 1 of the drawings, an embodiment of a light diffusion system constructed in accordance with the present invention is shown. The system is generally designated by the reference numeral 10. The optical fiber 11 is typically sheathed in a buffer jacket 12. The figure shows an optical fiber 11 made of glass or plastic, a buffer jacket 12 made of polyimide, silicone, acrylate, or polymers, a transparent tubing 13 made of Teflon, silicone, polymer, or other material, a diffusing chamber 19 made of a transparent material, air, plastic, glass, or diffusing material with embedded scatterers, and an end plug 14 made of plastic, glass, or metal. Typical dimensions for these components are fiber diameter 25–2000 $\mu$m, buffer jacket thickness 5–500 $\mu$m, tubing thickness 1–500 $\mu$m, tubing diameter generally the same as the fiber but it may be necked down to a smaller diameter, chamber length 0–5000 $\mu$m for microscopic applications and 0.1–10 cm for macroscopic devices. The distal end 15 of the fiber 11 delivers light to the diffusing chamber 19.

The light source comes from the proximal end 16 and is directed toward the distal end 15. The configuration takes advantage of a standard fiber terminating technique of polishing the buffer jacket flush or near flush with the fiber end. An optical source provides light energy 17 through the optical fiber 11. The light energy provides the diffuse light source 18.

The optical source can be an optical source such as that as described in U.S. Pat. No. 6,102,917, by Maitland et al, patented Aug. 15, 2000, as follows: "The catheter section, extension section, and control unit are interconnected by optic fiber connectors. Control unit includes a laser, laser control or driving electronics and display panel assembly generally indicated, and connected as indicated to laser. Laser is connected by optic fibers via an optic fiber connector to a fiber optic coupler, such as a conventional 90/10 optical coupler, which is connected via an optic fiber to optic fiber connector. Coupler, wherein 90 percent of the light passes through and 10 percent is Coupler, wherein 90 percent of the light passes through and 10 percent is bypassed, is also connected by an optic fiber to a sensing photodetector, which is connected to the display panel section of assembly as indicated. Coupler is also connected by an optic fiber to a source photodetector, which is connected to the driving electronics or control section of assembly, as indicated. Laser light (pulsed or continuous) from laser is transmitted, as indicated by pulses and arrows, through optic fiber, connector, optic fiber, coupler, optic fiber, connector, an optic fiber in extension section, connector, and an optic fiber in catheter section onto an end section of SMP microgripper, which retains the coil, causing heating of the material of microgripper located around the coil". The disclosure of U.S. Pat. No. 6,102,917 is incorporated herein by reference. Also, some subject matter is disclosed and claimed in the following commonly owned, copending, U.S. patent Application, "SHAPE MEMORY POLYMER ACTUATOR AND CATHETER," by Duncan J. Maitland, Abraham P. Lee, Daniel L. Schumann, Dennis L. Matthews, Derek Decker, and Charles A. Jungreis, patent application Ser. No. 09/761023, filed Jan. 16, 2001, incorporated herein by reference.

FIG. 2 illustrates another version of the basic diffusing chamber system of the present invention. This version of the basic diffusing chamber system is generally designated by the reference numeral 20. A fiber core 21, stripped of its cladding 22, and coated with a mechanically roughened polymer 30, such as $n_{polymer} > n_{core}$ is shown. The proximal end of the plug 27, a piece of fiber optic glass, is a bright surface.

The optical fiber 21 is typically sheathed in a buffer jacket 22. The figure shows an optical fiber 21 made of glass or plastic, a buffer jacket 22 made of polyimide, silicone, acrylate, or polymers, a transparent tubing 24 made of Teflon, silicone, polymer, or other material, a diffusing chamber 23 made of a scatterers, and an end plug 25 made of plastic, glass, or metal. Typical dimensions for these components are fiber diameter 25–2000 $\mu$m, buffer jacket thickness 5–500 $\mu$m, tubing thickness 1–500 $\mu$m, tubing diameter generally the same as the fiber but it may be necked down to a smaller diameter, chamber length 0–5000 $\mu$m for microscopic applications and 0.1–10 cm for macroscopic devices. The distal end 26 of the fiber 21 delivers light to the diffusing chamber 23.

The light source comes from the proximal end 27 and is directed toward the distal end 26. The configuration takes advantage of a standard fiber terminating technique of polishing the buffer jacket flush or near flush with the fiber end. An optical source provides light energy 28 through the optical fiber 21. The light energy provides the diffuse light source 29.

The optical source can be an optical source such as that as described in U.S. Pat. No. 6,102,917, by Maitland et al, patented Aug. 15, 2000, as follows: "The catheter section, extension section, and control unit are interconnected by optic fiber connectors. Control unit includes a laser, laser control or driving electronics and display panel assembly generally indicated, and connected as indicated to laser. Laser is connected by optic fibers via an optic fiber connector to a fiber optic coupler, such as a conventional 90/10 optical coupler, which is connected via an optic fiber to optic fiber connector. Coupler, wherein 90 percent of the light passes through and 10 percent is bypassed, is also connected by an optic fiber to a sensing photodetector, which is connected to the display panel section of assembly as indicated. Coupler is also connected by an optic fiber to a source photodetector, which is connected to the driving electronics or control section of assembly, as indicated. Laser light (pulsed or continuous) from laser is transmitted, as indicated by pulses and arrows, through optic fiber, connector, optic fiber, coupler, optic fiber, connector, an optic fiber in extension section, connector, indicated by pulses and arrows, through optic fiber, connector, optic fiber, coupler, optic fiber, connector, an optic fiber in extension section, connector, and an optic fiber in catheter section onto an end section of SMP microgripper, which retains the coil, causing heating of the material of microgripper located around the coil" The disclosure of U.S. Pat. No. 6,102,917 is incorporated herein by reference.

Figure 4:
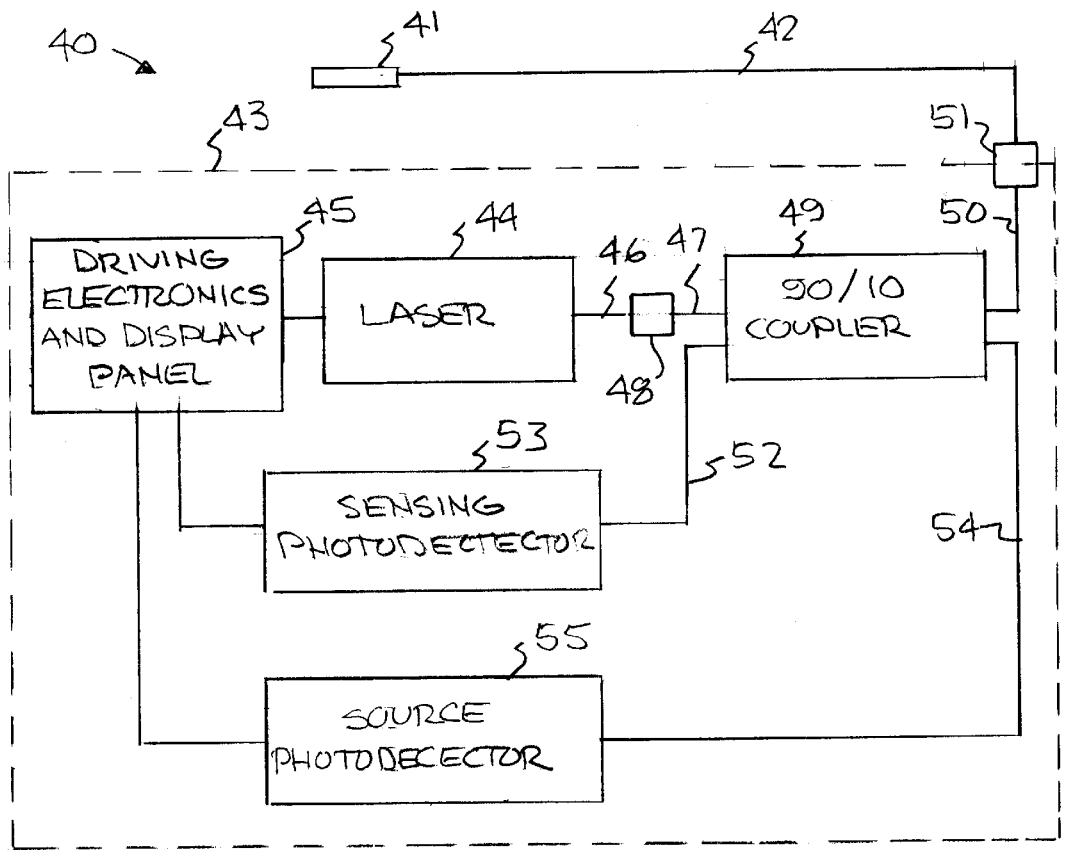
FIG. 4 illustrates the basic system multiplexed with a reflection based sensor.

Referring now to FIGS. 3, and 4, modes and systems of operating the light diffusing device are illustrated. FIG. 3 illustrates the basic operation of a light source coupled into an optical fiber, delivered to a light to a diffusion chamber, and delivered to the desired target by the light diffusion chamber and an end plug. A sensor operatively connected to the distal end of the optical fiber may be used to transmit information from the target area.

As shown by FIG. 3 light is radiated from the light source 31. The light source 31 provides light energy through the optical fiber 15. The light source 31 can be any one of various systems. For example, the light source 31 can as described in U.S. Pat. No. 6,102,917, by Maitland et al, patented Aug. 15, 2000. The light source can include a laser and laser control and driving electronics. The light is transmitted into the optical fiber 32. The optical fiber 32 is typically sheathed in a buffer jacket with additional material layers. The optical fiber 32 can be multimode with typical core dimensions between 50–1000 $\mu$m. The distal end of the optical fiber 32 delivers light to a diffusing chamber 33. The diffusing chamber 33 distributes the light evenly around the circumference of the chamber and along the chamber length. The light can be used for heating or otherwise treating a target. The distal end of the chamber 33 is terminated with a reflective plug that maximizes the amount of light released from the chamber 33. Typical lengths of the diffusing chamber are 100–5000 $\mu$m. A sensor operatively connected to the distal end of the optical fiber may be used to transmit information from the target area.

Referring now to FIG. 4, the basic system, previously described, is multiplexed with a reflection based sensor. In this case the light source includes a laser 44. A light diffusing device/sensor 41 is operatively connected to the distal end of the optical fiber and can be used to transmit information from the target area. The source power is monitored, via the fiber coupler (shown as 90/10 coupler but it could be any fiber or open air coupling system), by an optional photodetector. The inverted pulses show the reflected signal that will transmit the transduced signal from the sensor in the diffusing device. The system, generally indicated at 40, comprises a light diffusing device with sensor section 41 and an optic fiber 42. Control unit 43 includes a laser 44, laser control or driving electronics and display panel assembly generally indicated at 45, and connected as indicated to laser 44. Laser 44 is connected by optic fibers 46 and 47 via an optic fiber connector 48 to a fiber optic coupler 49, such as a conventional 90/10 optical coupler, which is connected via an optic fiber 50 to optic fiber connector 51. Coupler 49, wherein 90 percent of the light passes through and 10 percent is bypassed, is also connected by an optic fiber 52 to a sensing photodetector 53, which is connected to the display panel section of assembly 45. Coupler 49 is also connected by an optic fiber 54 to a source photodetector 55, which is connected to the driving electronics or control section of assembly 45. Laser light (pulsed or continuous) from laser 44 is transmitted, as indicated by pulses and arrows, through optic fiber 46, connector 48, optic fiber 47, coupler 49, optic fiber 50, connector 51, an optic fiber 42 onto an diffusing device/sensor 41.

A test was conducted wherein the light diffusing system of the present invention was compared to a diffusing device that requires the fiber cladding to be removed. The diffusing system of the present invention was clearly brighter. In this test two exercises in creating diffuse light with an optical fiber were compared on the same brightness scale. In the first exercise a fiber core, stripped of its cladding, and coated with a mechanically roughened polymer ($n_{polymer} > n_{core}$) was tested. The second exercise the diffusing system of the present invention was tested. The distal end of the fiber optic could not be seen. The proximal end of the plug, a piece of fiber optic glass, was the bright surface to the right of the image. The diffusing chamber was filled with air. The tube was the original plastic buffer jacket that was originally stripped. The results of the test were that the diffusing system of the present invention was brighter.

Additional enhancements include modifications to the diffusion chamber. The diffusion chamber can be any material with a lower refractive index than the tubing. The material in the diffusing chamber is preferably transparent or scattering in nature. Air, plastics and glass are likely materials in the diffusing chamber. Additionally, instead of the inner surface of the tubing being modified with reflective materials, etched or abraded, transducers or absorbing materials, the outer surface of the diffusing chamber material, if not air, may likewise be modified. The present invention provides a system that is easy to manufacture. The fiber, tubing, and plug materials are off-the-shelf components. Their modification by etching, coating and attaching transducers lend themselves to common manufacturing techniques.

Figure 5:
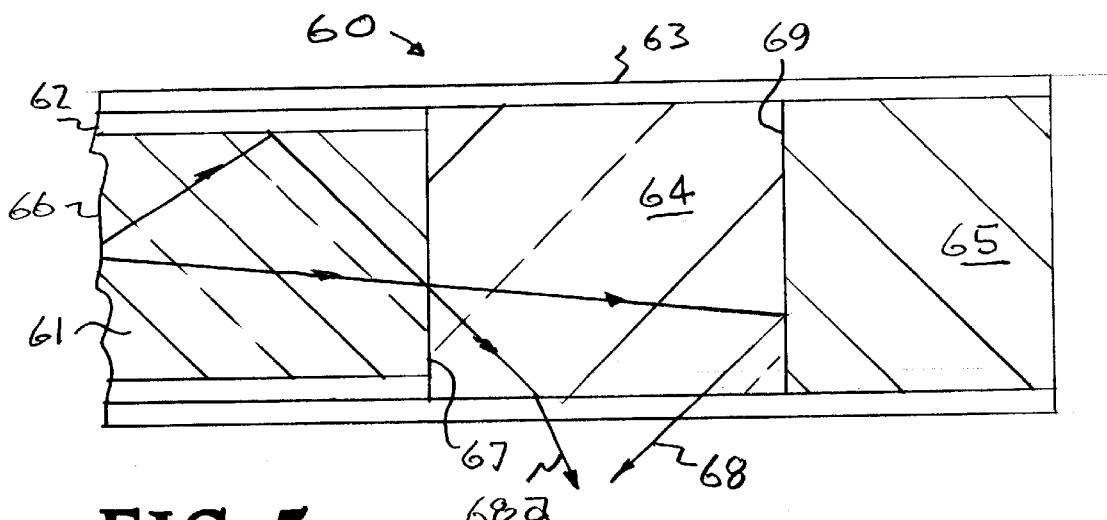
FIG. 5 illustrates an embodiment wherein the proximal end of the plug is reflective (specular or diffusive) such that the diffusive source is increased.

Other embodiments of the basic system describe above, are shown in FIGS. 5, 6, 7, 8, 9, and 10. In FIG. 5 the system is generally designated by the reference numeral 60. The optical fiber 61 is typically sheathed in a buffer jacket 62. The figure shows an optical fiber 61 made of glass or plastic, a buffer jacket 62 made of polyimide, silicone, acrylate, or polymers, a transparent tubing 63 made of Teflon, silicone, polymer, or other material, a diffusing chamber 64 made of a transparent material, air, plastic, glass, or diffusing material with embedded scatterers, and an end plug 65 made of plastic, glass, or metal. The distal end 67 of the optical fiber 61 delivers light to the diffusing chamber 64.

The light from the light source comes from the proximal end 66 and is directed toward the distal end 67. The configuration takes advantage of a fiber terminating technique of polishing the buffer jacket flush or near flush with the fiber end. An optical source provides light energy 68 and 68A through the optical fiber 61. The light energy provides the diffuse light source. The optical source can be an optical source such as that as described in U.S. Pat. No. 6,102,917, by Maitland et al, patented Aug. 15, 2000, incorporated herein by reference. The proximal end 69 of the plug 65 is reflective (specular or diffusive) such that the diffusive source is increased.

Figure 6:
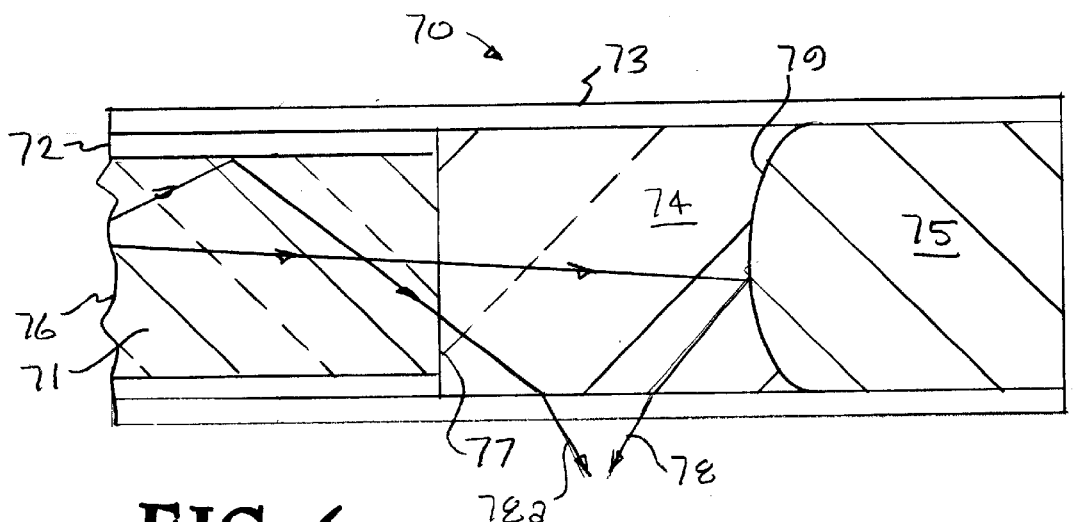
FIG. 6 illustrates an embodiment wherein the proximal end of the plug is convex in shape.

In FIG. 6 the system is generally designated by the reference numeral 70. The optical fiber 71 is typically sheathed in a buffer jacket 72. The figure shows an optical fiber 71 made of glass or plastic, a buffer jacket 72 made of polyimide, silicone, acrylate, or polymers, a transparent tubing 73 made of Teflon, silicone, polymer, or other material, a diffusing chamber 74 made of a transparent material, air, plastic, glass, or diffusing material with embedded scatterers, and an end plug 75 made of plastic, glass, or metal. The distal end 77 of the fiber 71 delivers light to the diffusing chamber 74.

The light from the light source comes from the proximal end 76 and is directed toward the distal end 77. The configuration takes advantage of a fiber terminating technique of polishing the buffer jacket flush or near flush with the fiber end. An optical source provides light energy 78 and 78A through the optical fiber 71. The light energy provides the diffuse light source. The optical source can be an optical source such as that as described in U.S. Pat. No. 6,102,917, by Maitland et al, patented Aug. 15, 2000, incorporated herein by reference. The proximal end 79 of the plug 75 is convex is shape. This includes all surfaces of revolution associated with cuts through a cone or mufti-faceted flat surfaces that approximate a smooth surface of curvature. The surface may or may not be reflective. The convex shape acts to enhance the diffusive light source.

Figure 7:
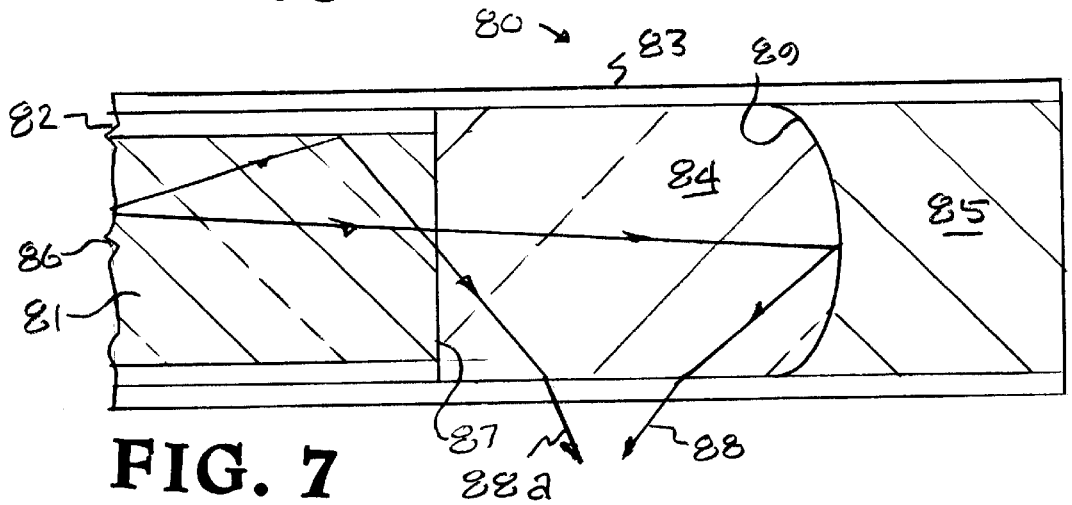
FIG. 7 illustrates an embodiment wherein the proximal end of the plug is concave is shape.

In FIG. 7 the system is generally designated by the reference numeral 80. The optical fiber 81 is typically sheathed in a buffer jacket 82. The figure shows an optical fiber 81 made of glass or plastic, a buffer jacket 82 made of polyimide, silicone, acrylate, or polymers, a transparent tubing 83 made of Teflon, silicone, polymer, or other material, a diffusing chamber 84 made of a transparent material, air, plastic, glass, or diffusing material with embedded scatterers, and an end plug 85 made of plastic, glass, or metal. The distal end of the fiber delivers light to the diffusing chamber.

The light from light source comes from the proximal end 86 and is directed toward the distal end 87. The configuration takes advantage of a fiber terminating technique of polishing the buffer jacket flush or near flush with the fiber end. An optical source provides light energy 88 and 88A through the optical fiber 81. The light energy provides the diffuse light source. The optical source can be an optical source such as that as described in U.S. Pat. No. 6,102,917, by Maitland et al, patented Aug. 15, 2000, incorporated herein by reference. The proximal end 89 of the plug 88 is concave is shape. This includes all surfaces of revolution associated with cuts through a cone or mufti-faceted flat surfaces that approximate the a smooth surface of curvature. The surface may or may not be reflective. The concave shape 89 acts to enhance the diffusive light source.

Figure 8:
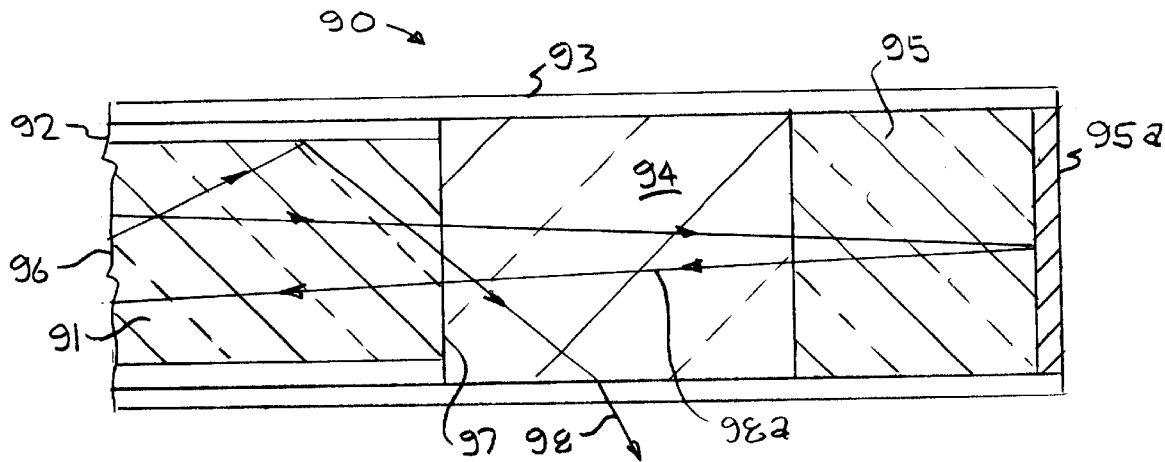
FIG. 8 illustrates an embodiment wherein the distal surface of the plug may be modified for transparent or near-transparent plugs.

In FIG. 8 the system is generally designated by the reference numeral 90. The optical fiber 91 is typically sheathed in a buffer jacket 92. The figure shows an optical fiber 91 made of glass or plastic, a buffer jacket 92 made of polyimide, silicone, acrylate, or polymers, a transparent tubing 93 made of Teflon, silicone, polymer, or other material, and a diffusing chamber 94 made of a transparent material, air, plastic, glass, or diffusing material with embedded scatterer. The distal end 97 of the fiber 91 delivers light to the diffusing chamber 94. The light from the light source comes from the proximal end 96 and is directed toward the distal end 97. An optical source provides light energy through the optical fiber 91. The optical source can be an optical source-such as that as described in U.S. Pat. No. 6,102,917, by Maitland et al, patented Aug. 15, 2000, incorporated herein by reference. The light energy 98 is diffused to the target area by the light diffusing chamber 94. A transparent or near-transparent plug 95 is connected to the distal end of light diffusing chamber 94. The distal end surface 95A of the plug 95 can include, but is not limited to, a reflective surface, attachment of an optical transducer, material coating(s), and doping the plug with a material that acts as an optical transducer. This allows for an optical sensor to be-built into the diffusive device. The light energy 98A is returned through the optical fiber 91 carrying a signal form the transducer.

Figure 9:
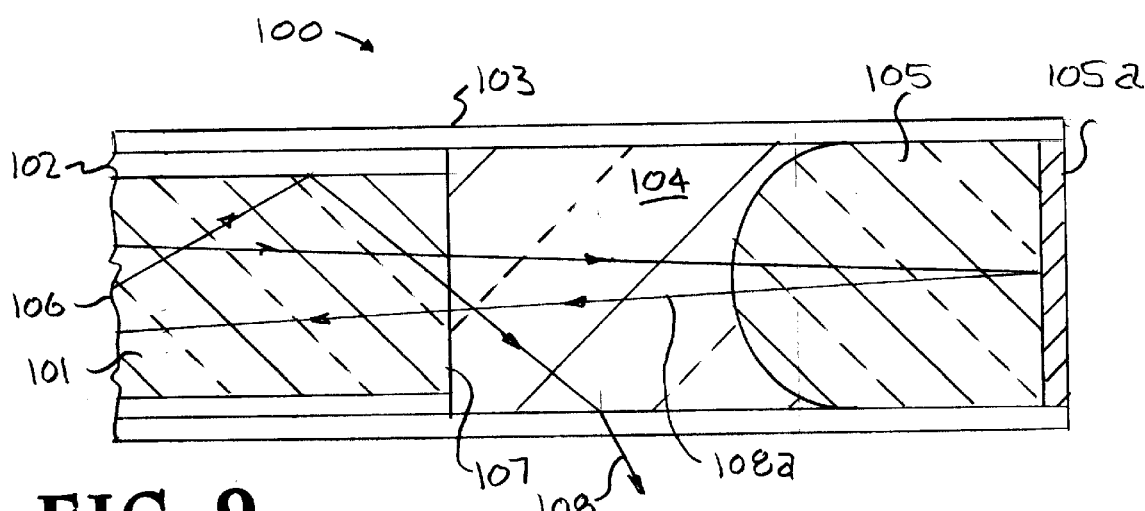
FIG. 9 illustrates an embodiment wherein the proximal surface of the transparent or near transparent plug may be modified in shape so as to enhance the transmission of light from the optical fiber to the plug or its distal surface and back into the optical fiber.

In FIG. 9 the system is generally designated by the reference numeral 100. The optical fiber 101 is typically sheathed in a buffer jacket 102. The figure shows an optical fiber 101 made of glass or plastic, a buffer jacket 102 made of polyimide, silicone, acrylate, or polymers, a transparent tubing 103 made of Teflon, silicone, polymer, or other material, a diffusing chamber 104 made of a transparent material, air, plastic, glass, or diffusing material with embedded scatterers, and an end plug 105. The distal end 107 of the fiber 101 delivers light to the diffusing chamber. The light from the light source comes from the proximal end 106 and is directed toward the distal end 107. An optical source provides light energy 108 through the optical fiber 101. The light energy provides the diffuse light source. The optical source can be an optical source such as that as described in U.S. Pat. No. 6,102,917, by Maitland et al, patented Aug. 15, 2000, incorporated herein by reference. A transparent or near-transparent plug 105 is connected to the distal end of light diffusing chamber 104. The distal end surface 105A of the plug 105 can be, but is not limited to, a reflective surface, attachment of an optical transducer, material coating(s), and doping the plug with a material that acts as an optical transducer. This allows for an optical sensor to be built into the diffusive device. The light energy 108A is returned through the optical fiber 101 carrying a signal form the transducer.

Figure 10:
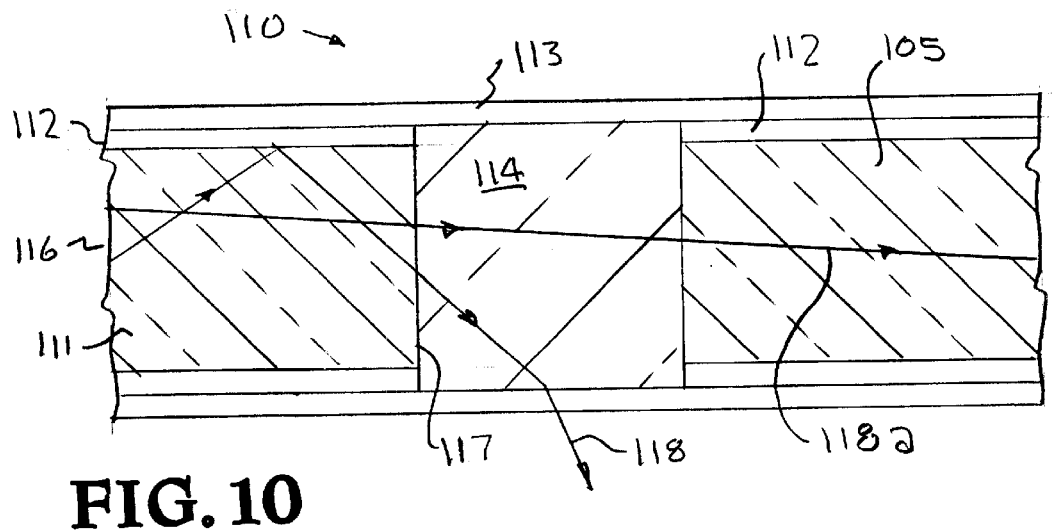
FIG. 10 illustrates an embodiment wherein the plug is an optical fiber.

In FIG. 10 the system is generally designated by the reference numeral 110. The optical fiber 111 is typically sheathed in a buffer jacket 112. The figure shows an optical fiber 111 made of glass or plastic, a buffer jacket 112 made of polyimide, silicone, acrylate, or polymers, a transparent tubing 113 made of Teflon, silicone, polymer, or other material, a diffusing chamber 114 made of a transparent material, air, plastic, glass, or diffusing material with embedded scatterers, and a second optical fiber 105 made of glass or plastic. The distal end of the fiber delivers light to the diffusing chamber. The light from the light source comes from the proximal end 116 and is directed toward the distal end 117. An optical source provides light energy 118 through the optical fiber 111. The light energy provides the diffuse light source. The optical source can be an optical source such as that as described in U.S. Pat. No. 6,102,917, by Maitland et al, patented Aug. 15, 2000, incorporated herein by reference. Attached to the distal end of the diffusing chamber 114 is an optical fiber 105. This allows multiple diffusing devices and sensors to be used serially and/or allows for a fiber-based sensor to be directly used in conjunction with the diffusing device 114. The optical fiber 105 may be connected to a transducer that interacts with the light 118A from the diffusing chamber 114 to sense desired parameters. The light energy 118A is returned through the optical fiber 111 carrying a signal form the transducer.

Figure 11:
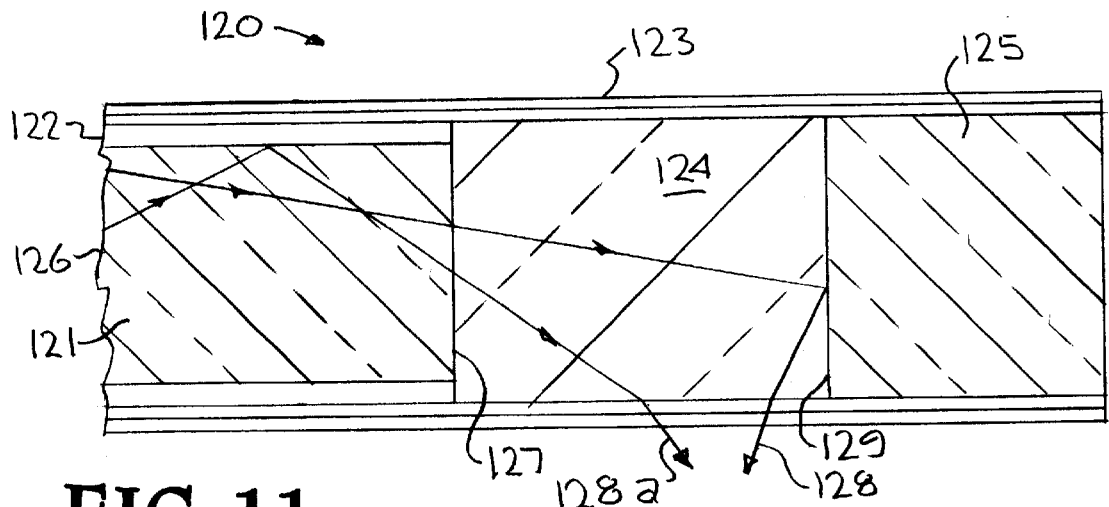
FIG. 11 illustrates an embodiment with modifications to the external tube that encases the diffusion device.

Other embodiments of the basic system describe above, are shown in are shown in FIGS. 11, 12, 13, 14, 15, and 16. FIG. 11 illustrates an embodiment with a tube enhancement. This embodiment, generally designated by the reference numeral 120, shows modifications to the external tube 123 that encases the diffusion device 124. In the embodiment of FIG. 11, the optical fiber 121 is typically sheathed in a buffer jacket 122. The figure shows an optical fiber 121 made of glass or plastic, a buffer jacket 122 made of polyimide, silicone, acrylate, or polymers, a diffusing chamber 124 made of a transparent material, air, plastic, glass, or diffusing material with embedded scatterers, an end plug 125 made of plastic, glass, or metal. The distal end 127 of the optical fiber 121 delivers light to the diffusing chamber 124. The light from the light source comes from the proximal end 126 and is directed toward the distal end 127 of the optical fiber 121. The light energy 128 and 128A is directed from the optical fiber 121 through the diffusing chamber 124 to the target area. The proximal end 129 of the plug 125 is reflective (specular or diffusive) such that the diffusive source is increased. As shown, the foregoing structure is contained in the external tube 123. The tube 123 is be constructed of multiple materials and/or layers. The tube multiple layers are selected to enhance the device 120 by changing its mechanical properties and/or facilitate a means of introducing multiple materials to the diffuse light.

Figure 12:
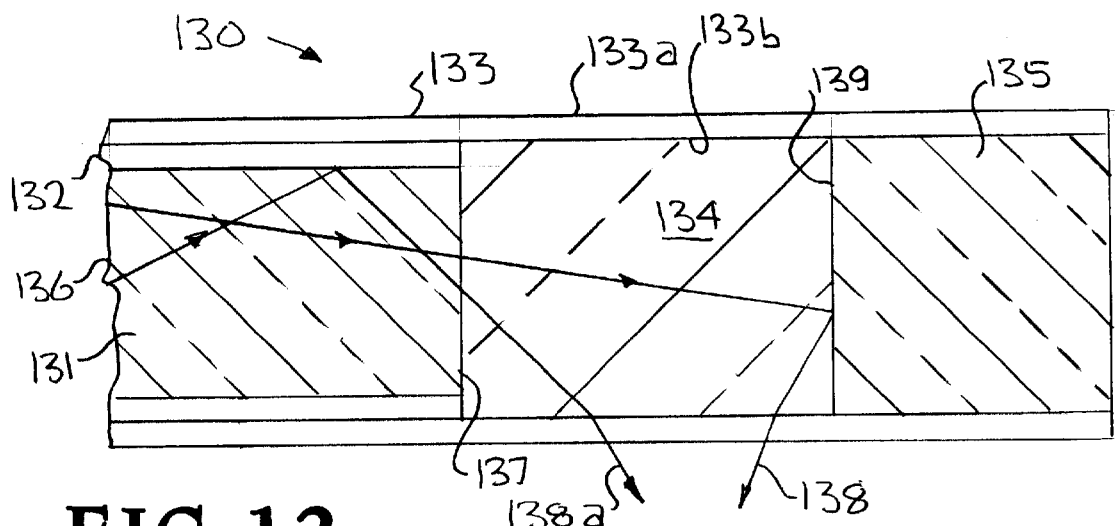
FIG. 12 illustrates an embodiment wherein the inner and/or outer surface of the tube are diffusely scattering.

The embodiment of FIG. 12 illustrates an embodiment, generally designated by the reference numeral 130. The optical fiber 131 is typically sheathed in a buffer jacket 132. The figure shows an optical fiber 131 made of glass or plastic, a buffer jacket 132 made of polyimide, silicone, acrylate, or polymers, a diffusing chamber 134 made of a transparent material, air, plastic, glass, or diffusing material with embedded scatterers, an end plug 135 made of plastic, glass, or metal. The distal end 137 of the optical fiber 131 delivers light to the diffusing chamber 134. The light from the light source comes from the proximal end 136 and is directed toward the distal end 137 of the optical fiber 131. The light energy 138 and 138A is directed from the optical fiber 131 through the diffusing chamber 134 to the target area. The proximal end 139 of the plug 135 is reflective (specular or diffusive) such that the diffusive source is increased. As shown, the foregoing structure is contained in the external tube 133. The inner surface 133B and/or outer surface 133A of the tube 135 are diffusely scattering. This is achieved by abrading or etching the inner surface 133B and/or outer surface 133A of the tube 135 with mechanical or chemical means. The scattering properties of the surface may be a function of axial and/or radial position. The scattering surfaces enhance the basic design by modifying the diffuse nature of the light source.

Figure 13:
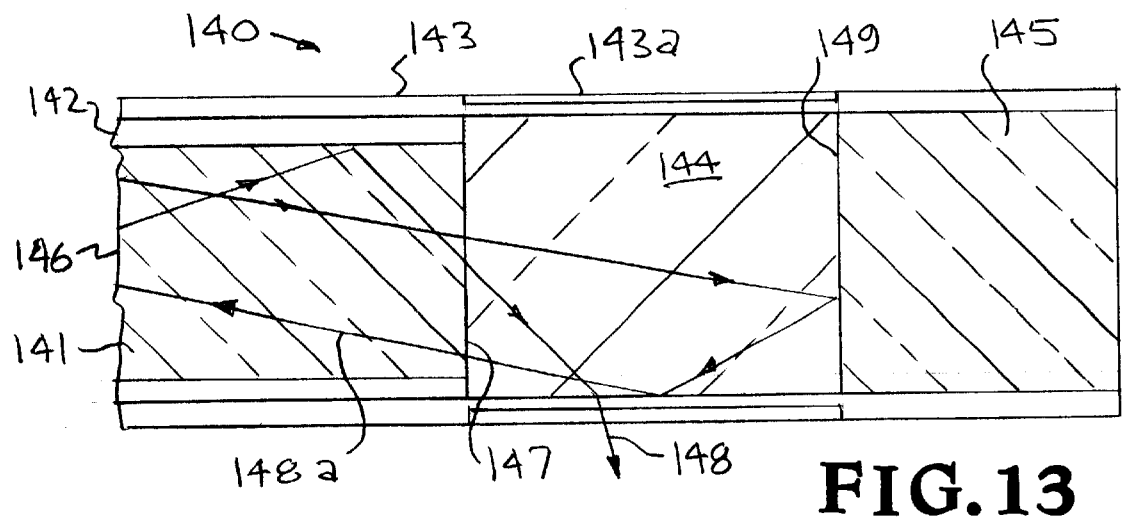
FIG. 13 illustrates an embodiment wherein the tube has an embedded or coated transducer on or about its external surface.

The embodiment of FIG. 13 illustrates an embodiment, generally designated by the reference numeral 140. The optical fiber 141 is typically sheathed in a buffer jacket 142. The figure shows an optical fiber 141 made of glass or plastic, a buffer jacket 142 made of polyimide, silicone, acrylate, or polymers, a diffusing chamber 144 made of a transparent material; air, plastic, glass, or diffusing material with embedded scatterers, an end plug 145 made of plastic, glass, or metal. The distal end 147 of the optical fiber 141 delivers light to the diffusing chamber 144. The light from the light source comes from the proximal end 146 and is directed toward the distal end 147 of the optical fiber 141. The light energy 148 is directed from the optical fiber 141 through the diffusing chamber 144 to the target area. The proximal end 149 of the plug 145 is reflective (specular or diffusive) such that the diffusive source is increased. As shown, the foregoing structure is contained in the external tube 143. The tube 143 has an embedded or coated transducer 143A on or about its external surface. The transducer 143A may be partially or totally absorbing of light 148A. The transducer 143A may also act to alter the wavelength of the incident light 148A. The transducer 143 may span all or part of the radial or axial area. This transducer 143A placement enhances the device's ability to act as a sensor.

Figure 14:
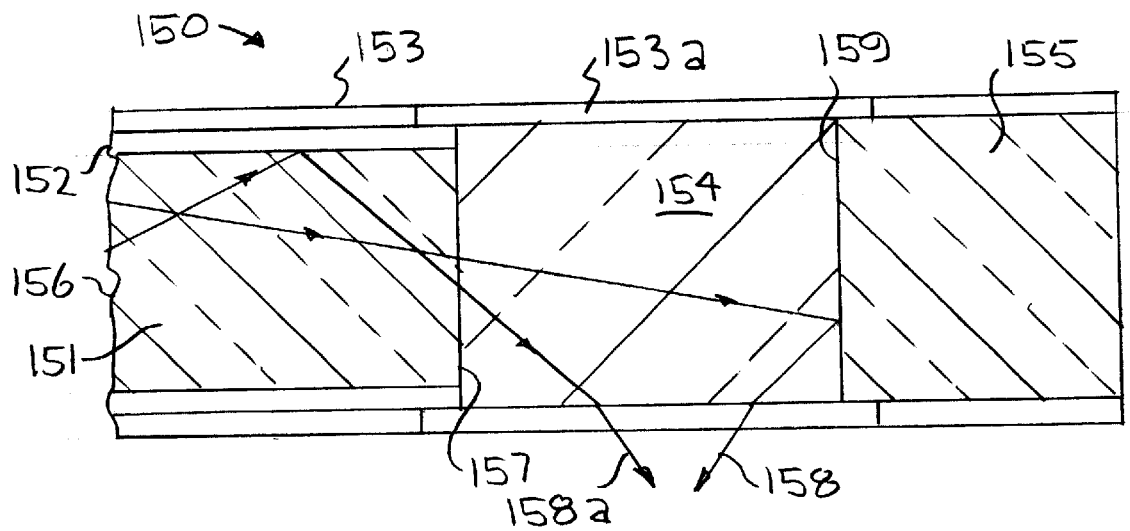
FIG. 14 illustrates an embodiment wherein the tubing is doped with absorbing, transducing or scattering materials.

The embodiment of FIG. 14 illustrates an embodiment, generally designated by the reference numeral 150. The optical fiber 151 is typically sheathed in a buffer jacket 152. The figure shows an optical fiber 151 made of glass or plastic, a buffer jacket 152 made of polyimide, silicone, acrylate, or polymers, a diffusing chamber 154 made of a transparent material, air, plastic, glass, or diffusing material with embedded scatterers, an end plug 155 made of plastic, glass, or metal. The distal end 157 of the optical fiber 151 delivers light to the diffusing chamber 154. The light from the light source comes from the proximal end 156 and is directed toward the distal end 157 of the optical fiber 151. The light energy 158 and 158A is directed from the optical fiber 151 through the diffusing chamber 154 to the target area. The proximal end 159 of the plug 155 is reflective (specular or diffusive) such that the diffusive source is increased. As shown, the foregoing structure is contained in the external tube 153. The tubing may be doped with absorbing, transducing or scattering materials. This material 153A may be used to control the axial distribution of diffuse light Also, the doped material 153A may be used to enhance the diffuse nature of the light source. Finally, the tube 153 may be made into a transducer if the proper material 153A, such as a fluoraphore, is embedded in the tubing 153.

Figure 15:
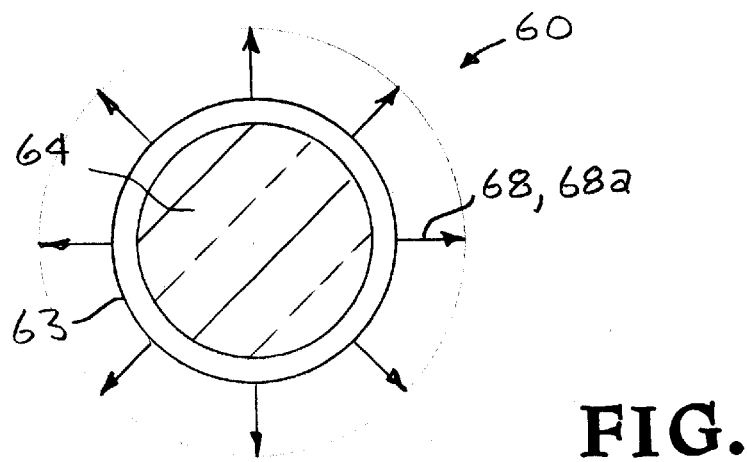
FIG. 15 illustrates an embodiment wherein a full angle (360°) radial radiation pattern is included.

In FIG. 15 a full angle (360°) radial radiation pattern is illustrated in connection with FIG. 6. As shown in FIGS. 5 and 15 the system is generally designated by the reference numeral 60. The optical fiber 61 is typically sheathed in a buffer jacket 62 made of polyimide, silicone, acrylate, or polymers. The optical fiber 61 is contained in a transparent tubing 63 made of Teflon, silicone, polymer, or other material. A diffusing chamber 64 made of a transparent material, air, plastic, glass, or diffusing material with embedded scatterers is connected to the distal end 67 of the optical fiber 61. An end plug 65 made of plastic, glass, or metal scatterers is connected to the distal end 67 of the diffusing chamber 64. An optical source provides light energy 68 and 68A that is transmitted from the diffusing chamber 64, as best shown in FIG. 15.

Figure 16:
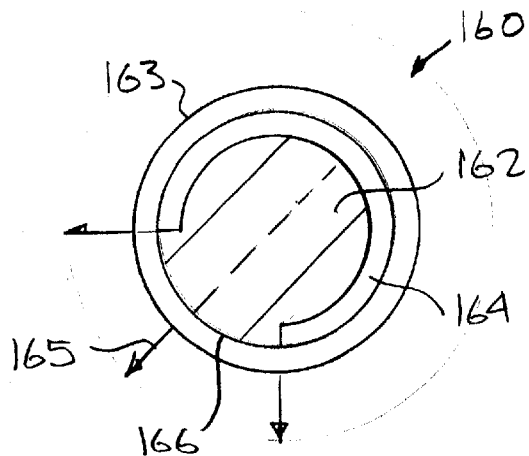
FIG. 16 illustrates an embodiment wherein the total angle and directions of the diffuse source may be controlled.

In the embodiment of FIG. 16, the total angle and directions of the diffuse source may be controlled by combinations of other embodiments. As shown in FIG. 16, the system is generally designated by the reference numeral 160. The optical fiber is contained in a transparent tubing 163 made of Teflon, silicone, polymer, or other material. A diffusing chamber 162 made of a transparent material, air, plastic, glass, or diffusing material with embedded scatterers is connected to the distal end of the optical fiber. An end plug made of plastic, glass, or metal scatterers is connected to the distal end of the diffusing chamber. The diffusing chamber 162 transmits the light energy 165 in a radial direction outward. The diffusing chamber 162 has modified surface 164 that provides a window 166 for the light. Multiple windows provided by openings in the modified surface 164 may be used to transmit the diffuse light in more than one direction.

What is claimed is:

1. A light diffusion system for transmitting light to a target area, said light transmitted by an optical fiber in a direction from a proximal end of said optical fiber to a distal end of said optical fiber, comprising:

a cylindrical diffusing chamber operatively connected to said distal end of said optical fiber for transmitting said light from said distal end of said optical fiber to said target area, said cylindrical diffusing chamber being made of a diffusing material and having a diffusing chamber end farthest from said distal end of said optical fiber, a cylindrical plug operatively connected to said diffusing chamber end for increasing the light that is transmitted to said target area, said cylindrical plug having a reflective surface facing said diffusing chamber for reflecting said light back into said diffusing chamber, and a tube around said diffusing chamber and said plug, said tube extending from said distal end of said optical fiber around said diffusing chamber and around said plug, said tube made of a transparent material to allow said light to exit from said diffusing chamber.

2. The light diffusion system of claim 1, wherein said reflective surface of said plug is adjacent said diffusing chamber end and wherein said reflective surface of said plug is a convex surface for increasing the light that is transmitted to said target area.

3. The light diffusion system of claim 1, wherein said reflective surface of said plug is adjacent said diffusing chamber end and wherein said reflective surface of said plug is a concave surface for increasing the light that is transmitted to said target area.

4. The light diffusion system of claim 1, wherein said diffusing chamber transmits some of the light to said target area, wherein said plug is relatively transparent to said light, and wherein said reflective surface of said plug is spaced from said diffusing chamber end for returning the light through said relatively transparent plug and through said diffusing chamber to said optical fiber carrying a signal back through said optical fiber.

5. The light diffusion system of claim 1, wherein said diffusing chamber transmits some of the light to said target area, wherein said plug is relatively transparent to said light, and including a second optical fiber operatively connected to said plug opposite said diffusing chamber for receiving some of the light.

6. The light diffusion system of claim 1, wherein said diffusing chamber has a modified surface on a portion of the area between said diffusing chamber and said tube around said diffusing chamber thereby providing a window that transmits said light to a specific portion of said target area.

7. The light diffusion system of claim 1, wherein said tube around said diffusing chamber and said plug is made of Teflon, silicone, or polymer.

8. The light diffusion system of claim 1, wherein said diffusing chamber is made of a plastic or glass.

9. The light diffusion system of claim 1, wherein said diffusing chamber is made of a diffusing material with embedded scatterers.

10. The light diffusion system of claim 7, wherein said plug is made of plastic, glass, or metal.

11. The light diffusion system of claim 10, wherein said tube around said diffusing chamber is diffusely scattering resulting from abrading or etching the inner surface and/or outer surface of the said tube with mechanical or chemical means.

12. The light diffusion system of claim 1, wherein said tube around said diffusing chamber has a refractive index and said diffusing chamber has a refractive index, and wherein said refractive index of diffusing chamber is lower than the refractive index of said tube.

13. A method of manufacturing a light diffusing system for transmitting light to a target area, said light transmitted by an optical fiber in a direction from a proximal end of said optical fiber to a distal end of said optical fiber, comprising the steps of:

operatively connecting a cylindrical diffusing chamber to said distal end of said of said optical fiber for transmitting light from said distal end of said optical fiber to said target area, said cylindrical diffusing chamber being made of a diffusing material and having a diffusing chamber end farthest from said distal end of said optical fiber, operatively connecting a cylindrical plug to said diffusing chamber end for increasing the light that is transmitted to said target area, said cylindrical plug having a reflective surface facing said diffusing chamber for reflecting said light back into said diffusing chamber, and operatively connecting a tube around said diffusing chamber and around said plug, said tube extending from said distal end of said optical fiber around said diffusing chamber and around said plug, said tube made of a transparent material to allow said light to exit from said diffusing chamber.

14. The method of manufacturing a light diffusing system of claim 13, including providing a convex reflective surface on said plug for increasing the light that is transmitted to said target area and locating said convex reflective surface of said plug adjacent said diffusing chamber end.

15. The method of manufacturing a light diffusing system of claim 13, including providing a concave reflective surface on said plug for increasing the light that is transmitted to said target area and locating said concave reflective surface of said plug adjacent said diffusing chamber end.

16. The method of manufacturing a light diffusing system of claim 13, wherein said diffusing chamber transmits some of the light to said target area, wherein said plug is relatively transparent to said light, and wherein said reflective surface of said plug is spaced from said diffusing chamber end for returning the light through said relatively transparent plug and through said diffusing chamber to said optical fiber carrying a signal back through said optical fiber.

17. The method of manufacturing a light diffusing system of claim 13, wherein diffusing chamber is constructed to transmit some of the light to said target area, wherein said plug is relatively transparent to said light, and including a second optical fiber operatively connected to said plug opposite said diffusing chamber for receiving some of the light.

18. The method of manufacturing a light diffusing system of claim 13, wherein said diffusing chamber has a modified surface on a portion of the area between said diffusing chamber and said tube around said diffusing chamber thereby providing a window that transmits said light to a specific portion of said target area.

19. The method of manufacturing a light diffusing system of claim 13, wherein said tube around said diffusing chamber and said plug is made of Teflon, silicone, or polymer.

20. The method of manufacturing a light diffusing system of claim 13, wherein said diffusing chamber is made of a plastic or glass.

21. The method of manufacturing a light diffusing system of claim 13, wherein said diffusing chamber is made of a diffusing material with embedded scatterers.

22. The method of manufacturing a light diffusing system of claim 19, wherein said plug is made of plastic, glass, or metal.

23. The method of manufacturing a light diffusing system of claim 19, wherein said tube around said diffusing chamber is diffusely scattering resulting from abrading or etching the inner surface and/or outer surface of the said tube with mechanical or chemical means.

24. The method of manufacturing a light diffusing system of claim 13, wherein said tube around said diffusing chamber has a refractive index and said diffusing chamber has a refractive index, and wherein said refractive index of diffusing chamber is lower than the refractive index of said tube.

* * * * *